(12) United States Patent
Rodney

(10) Patent No.: US 7,348,892 B2
(45) Date of Patent: Mar. 25, 2008

(54) PIPE MOUNTED TELEMETRY RECEIVER

(75) Inventor: Paul F. Rodney, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 416 days.

(21) Appl. No.: 10/760,693

(22) Filed: Jan. 20, 2004

(65) Prior Publication Data

US 2005/0156754 A1 Jul. 21, 2005

(51) Int. Cl.
*G01V 3/00* (2006.01)

(52) U.S. Cl. .............. 340/853.1; 340/853.3; 340/854.4; 340/854.5; 175/40; 166/77.1

(58) Field of Classification Search .......... 340/853.1, 340/853.7, 854.1, 853.3, 853.4, 853.2; 166/77.1, 166/242.6, 385

See application file for complete search history.

(56) References Cited

U.S. PATENT DOCUMENTS

| | | | | |
|---|---|---|---|---|
| 3,918,537 A | * | 11/1975 | Heilhecker | 175/320 |
| 4,463,814 A | * | 8/1984 | Horstmeyer et al. | 175/45 |
| 4,590,593 A | | 5/1986 | Rodney | |
| 4,670,862 A | * | 6/1987 | Staron et al. | 367/25 |
| 4,770,105 A | * | 9/1988 | Takagi et al. | 104/138.2 |
| 5,056,067 A | | 10/1991 | Drumheller | |
| 5,128,901 A | | 7/1992 | Drumheller | |
| 5,160,925 A | | 11/1992 | Dailey et al. | |
| 5,184,676 A | | 2/1993 | Graham et al. | |
| 5,222,049 A | | 6/1993 | Drumheller | |
| 5,274,606 A | | 12/1993 | Drumheller et al. | |
| 5,454,419 A | * | 10/1995 | Vloedman | 166/277 |
| 5,477,505 A | | 12/1995 | Drumheller | |
| 5,521,337 A | * | 5/1996 | Chen et al. | 181/102 |
| 5,691,687 A | | 11/1997 | Kumagai et al. | |
| 5,703,836 A | | 12/1997 | Drumheller | |
| 5,941,307 A | | 8/1999 | Tubel | |
| 5,995,449 A | | 11/1999 | Green et al. | |
| 6,026,911 A | * | 2/2000 | Angle et al. | 175/24 |
| 6,041,872 A | * | 3/2000 | Holcomb | 175/40 |
| 6,046,685 A | | 4/2000 | Tubel | |
| 6,057,784 A | | 5/2000 | Schaaf et al. | |

(Continued)

FOREIGN PATENT DOCUMENTS

WO WO9318277 * 9/1993

OTHER PUBLICATIONS

Retrieved from the Internet on May 21, 2004; <URL http://ww.nasatech.com/Briefs/Mar03/ARC12072.html; (3 p.).

(Continued)

*Primary Examiner*—Jeffery Hofsass
*Assistant Examiner*—Sisay Yacob
(74) *Attorney, Agent, or Firm*—Conley Rose, P.C.

(57) ABSTRACT

Methods and apparatus for receiving a telemetry signal with a receiver that is moveably disposed within a drillstring. In certain embodiments, the system comprises a surface module coupled to the upper end of a drillstring, an upper module detachably connected to the surface module, and a lower module moveably disposed within the drillstring. The lower module is coupled to the upper module by an extendable cable. A telemetry signal receiver is disposed on said lower module, which also includes a tractor assembly for moving the lower module through the drillstring.

20 Claims, 2 Drawing Sheets

U.S. PATENT DOCUMENTS

| | | |
|---|---|---|
| 6,087,934 A | 7/2000 | Golab |
| 6,137,747 A | 10/2000 | Shah et al. |
| 6,144,316 A | 11/2000 | Skinner |
| 6,147,932 A | 11/2000 | Drumheller |
| 6,161,630 A | 12/2000 | Stump et al. |
| 6,188,647 B1 | 2/2001 | Drumheller |
| 6,192,988 B1 | 2/2001 | Tubel |
| 6,289,993 B1 * | 9/2001 | Dallas ................. 166/386 |
| 6,310,829 B1 | 10/2001 | Green et al. |
| 6,320,820 B1 | 11/2001 | Gardner et al. |
| 6,369,718 B1 | 4/2002 | Mathieu |
| 6,370,082 B1 | 4/2002 | Gardner et al. |
| 6,392,561 B1 | 5/2002 | Davies et al. |
| 6,397,946 B1 | 6/2002 | Vail, III |
| 6,434,435 B1 | 8/2002 | Tubel et al. |
| 6,435,286 B1 | 8/2002 | Stump et al. |
| 6,446,895 B1 | 9/2002 | Baenziger et al. |
| 6,464,004 B1 * | 10/2002 | Crawford et al. ...... 166/250.01 |
| 6,629,568 B2 * | 10/2003 | Post et al. ............. 166/382 |
| 6,648,082 B2 | 11/2003 | Schultz et al. |
| 6,655,453 B2 | 12/2003 | Head |
| 2002/0050930 A1 * | 5/2002 | Thomeer et al. ......... 340/853.3 |
| 2002/0140572 A1 | 10/2002 | Gardner et al. |
| 2002/0167418 A1 | 11/2002 | Goswami et al. |
| 2003/0011490 A1 | 1/2003 | Bailey et al. |
| 2003/0048198 A1 * | 3/2003 | Schultz et al. .......... 340/853.3 |
| 2003/0063014 A1 | 4/2003 | Stolarczyk |
| 2003/0090390 A1 | 5/2003 | Snider et al. |
| 2004/0004553 A1 | 1/2004 | Rodney |
| 2005/0072577 A1 * | 4/2005 | Freeman ................. 166/386 |

OTHER PUBLICATIONS

*Retrieved from the Internet on May 21,2004*; <URL: http://ww.idb.wales.com/ieee_97.pdf; Design *and Evaluation of the Power and Data Contactless Transfer Device: Robert, et al. (ll p.).*

20010054969 12-27-2001 Thomeer et al.
20020050930 05-02-2002 Thomeer et al.
20020113718 08-22-2002 Wei et al.

\* cited by examiner

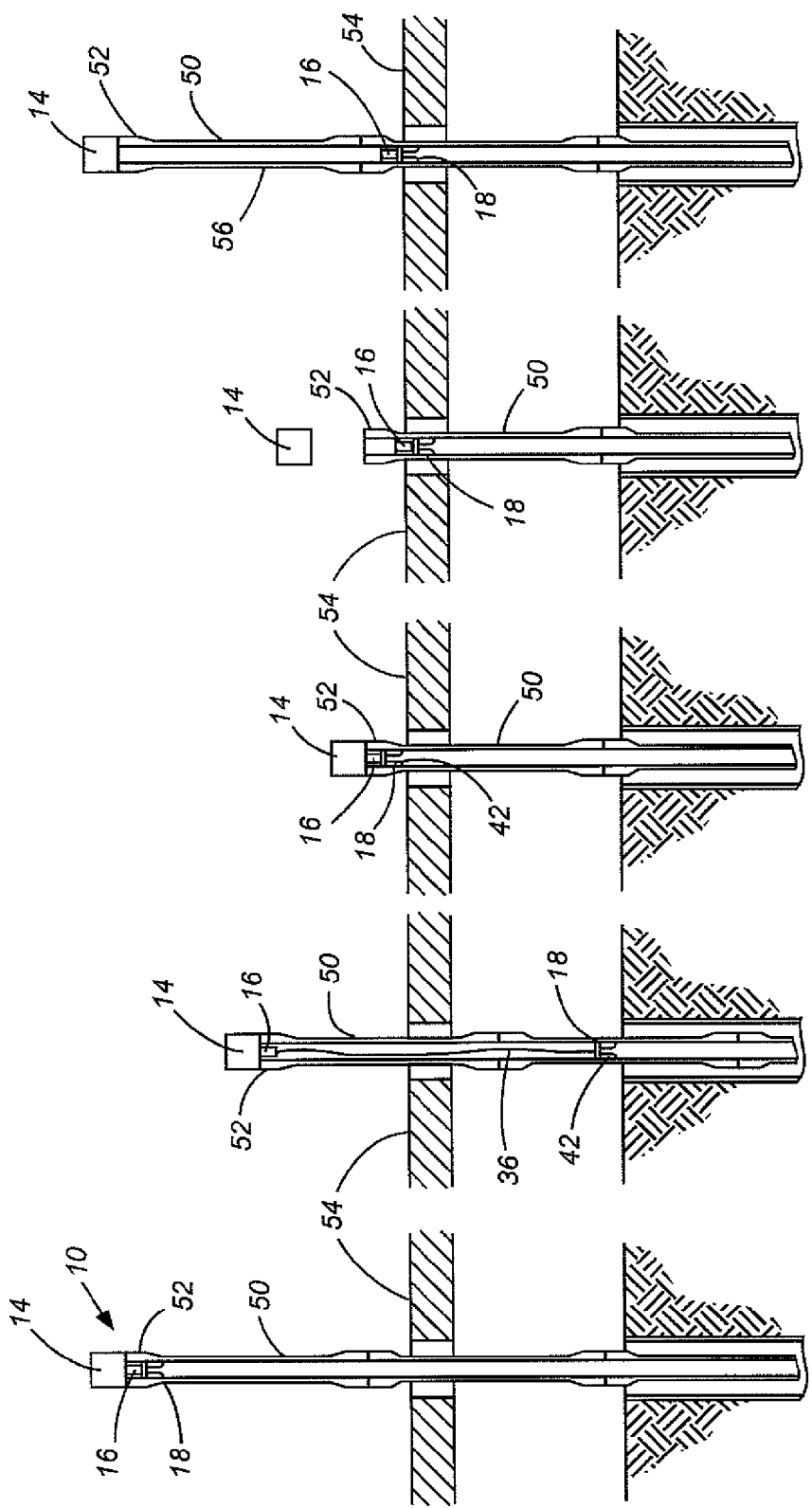

PIPE MOUNTED TELEMETRY RECEIVER

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention relates generally to methods and apparatus for receiving downhole telemetry data. More specifically the present invention relates to a telemetry receiver mounted within the drill pipe and selectively locatable at a position below the drill floor.

BACKGROUND

Modern petroleum drilling and production operations demand a great quantity of information relating to parameters and conditions downhole. Such information typically includes characteristics of the earth formations traversed by the wellbore, along with data relating to the size and configuration of the borehole itself. The collection of information relating to conditions downhole, which commonly is referred to as "logging", can be performed by several methods. In conventional wireline logging, the drill string is removed from the wellbore and a probe containing selected instrumentation is lowered into the wellbore on a wire that supports the instruments and provides a direct communication link to the surface.

It is often desired to collect data during the drilling process while the drill string is in the wellbore, thus allowing the driller to make accurate modifications or corrections as needed to optimize performance. Designs for measuring wellbore conditions and formation parameter during drilling have come to be known as "measurement-while-drilling" (MWD) or "logging while drilling" (LWD) techniques. While distinctions between MWD and LWD may exist, the terms MWD and LWD often are used interchangeably. For the purposes of this disclosure, the term MWD will be used with the understanding that this term encompasses both the collection of formation parameters and the collection of information relating to the movement and position of the drilling assembly.

Data gathered by MWD tools is typically transmitted to the surface by sensors or transducers located at the lower end of the drill string. While drilling is in progress, these sensors continuously or intermittently monitor selected drilling parameters and formation data and use some form of telemetry to transmit the information to a detector located at the surface. There are a number of telemetry systems in the art that seek to transmit information regarding downhole parameters up to the surface without requiring the use of a physical connection, such as a wire.

Acoustic telemetry is one of the systems used for MWD applications and operates by creating acoustic signals that travel to the surface along the drill string or through the fluid in the well. The acoustic telemetry signal is received at or near the surface using an accelerometer, or some similar device that is sensitive to motion. When acoustic telemetry is attempted through the drill pipe, each pipe joint acts as a reflector of acoustic radiation. The net effect of all these reflections is the creation of a comb-like structure of pass bands and stop bands where the range of frequencies of any of the pass bands is fairly narrow. The combined effect of a narrow frequency band and multiple reflections causes nodes and anti-nodes to be distributed along the pipe, where the signal is strongest at a node and weakest at an anti-node.

The transmission of data can be negatively affected by pulse spreading, distortion, attenuation, modulation rate limitations, and other disruptive forces, such as the ambient noise in the drill string. The largest source of ambient noise in the drill string is the drilling rig. Thus, receivers located at or near the surface are subjected to high levels of ambient noise generated by the drilling rig. These high levels of noise can interfere with the reception of telemetry signals and often require additional filtering or other processing of the received signals before useful analysis can be performed.

Therefore, while receiving telemetry signals at the surface is an important aspect of MWD or LWD processes, the inherent noise of the drilling rig often makes the surface one of the least desirable locations for placing a receiver. Accordingly, there remains a need to develop telemetry signal receiving methods and apparatus that overcome certain of the foregoing difficulties while providing more advantageous overall results.

SUMMARY OF THE PREFERRED EMBODIMENTS

The embodiments of the present invention are directed to methods and apparatus for receiving a telemetry signal with a receiver that is moveably disposed within a drillstring. In certain embodiments, the system comprises a surface module coupled to the upper end of a drillstring, an upper module detachably connected to the surface module, and a lower module moveably disposed within the drillstring. The lower module is coupled to the upper module by an extendable cable. A telemetry signal receiver is disposed on said lower module, which also includes a tractor assembly for moving the lower module through the drillstring.

In one embodiment, a wellbore telemetry system comprises a surface module coupled to the upper end of a drillstring, an upper module detachably connected to the surface module and disposed within the drillstring, a lower module moveably disposed within the drillstring and coupled to the upper module, and a telemetry signal receiver disposed on said lower module. The lower module further comprises a tractor assembly adapted to move the lower module through the drillstring. A detachable electrical connector couples the surface module to the upper module, which further comprises a cable reel, wherein a cable is spooled onto the cable reel and coupled to the lower module and the upper module.

In an another embodiment, a method for receiving telemetry signals comprises disposing a receiver array within a drillstring, moving the receiver array within the drillstring to improve reception of telemetry signals, and relaying the received signals to a data analysis system. The receiver array is disposed on one or more tractor assemblies adapted to move the array within the drillstring. The method further comprises disposing an upper assembly in the drillstring, wherein the receiver array is coupled to the upper assembly by a cable; connecting a surface module to the upper end of the drillstring; and detachably connecting the upper assembly to the surface module. The received signals are relayed from the receiver array through the cable to the upper assembly, from the upper assembly to the surface module, and from the surface module to the data analysis system.

In another embodiment, a method for using a telemetry receiver system comprises installing a telemetry receiver system on a drillstring. The telemetry receiver system comprises a surface module coupled to the upper end of a drillstring, an upper module detachably connected to the surface module and disposed within the drillstring, and a lower module moveably disposed within the drillstring and coupled to the upper module. The lower module comprises a receiver. The method further comprises moving the lower module within the drillstring to a location optimizing the reception of telemetry signals and relaying telemetry signals from the receiver to a data analysis system through the upper module and the surface module.

Thus, the present invention comprises a combination of features and advantages that enable it to overcome various shortcomings of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein:

FIGS. 3a-3e illustrate drilling operations with a pipe mounted telemetry receiver.

DETAILED DESCRIPTION OF THE PREFERRED EMBODIMENTS

Figure 2:
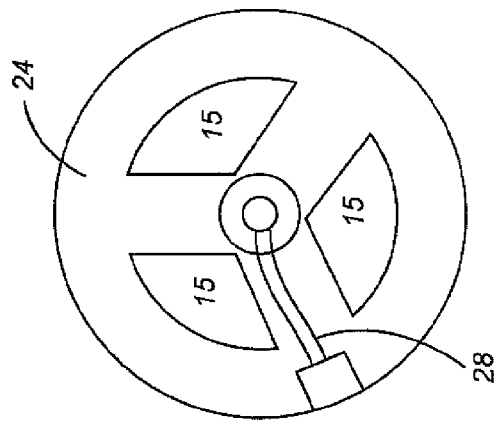
FIG. 2 illustrates a top view of the receiver of FIG. 1.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results.

In particular, various embodiments described herein thus comprise a combination of features and advantages that overcome some of the deficiencies or shortcomings of prior art telemetry systems. The various characteristics mentioned above, as well as other features and characteristics described in more detail below, will be readily apparent to those skilled in the art upon reading the following detailed description of preferred embodiments, and by referring to the accompanying drawings.

Figure 1:
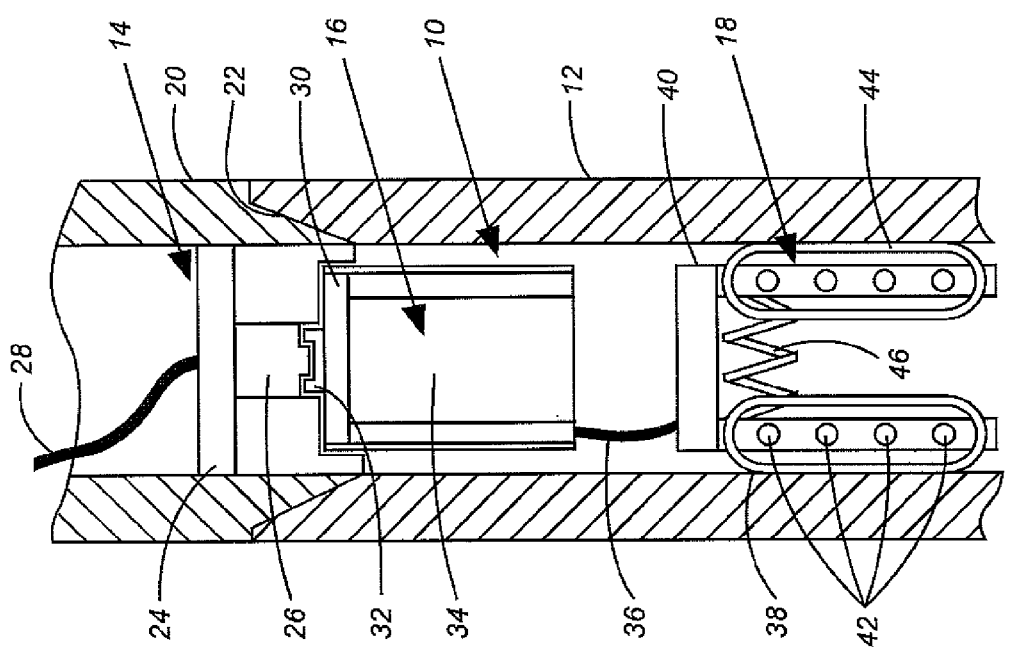
FIG. 1 illustrates a schematic elevation view showing a pipe mounted telemetry receiver.

Referring now to FIG. 1, one embodiment of a telemetry receiver system 10 is shown disposed in a pipe 12. System 10 includes surface module 14, upper module 16, and lower module 18. Each module 14, 16, and 18 has one or more fluid paths 15 allowing fluid to be circulated through the pipe. Surface module 14 comprises a body 20 including a pipe connection 22 and support frame 24. An electrical wet connector 26 is suspended from support frame 24. Cable 28 extends from support frame 24 and provides a communications link to a data analysis system. Cable 28 may extend through a pipe wall to a transmitter on the outside of the unit or may extend to a rotating transformer that is fixed to the swivel and provides communication with the data analysis system.

Upper module 16 includes base 30 supporting an electrical wet connector 32 and a bobbin or reel 34 supporting a cable 36. Reel 34 preferably includes a level wind apparatus that controls the winding of cable 36 onto and off of the reel. In the current context bobbin and reel may be used interchangeably to describe the component of upper module 16 on which cable 36 is stored and wound to and from. In some embodiments, upper module 16 may include a tractor assembly or anchor assembly to control the location of the upper module within pipe 12.

Lower module 18 includes tractor assembly 38 supporting interface 40 and accelerometer array 42. Interface 40 includes an electronics module and any electromechanical components required to operate tractor assembly 38 and enable communication with array 42. Tractor assembly 38 has tracks 44 pushed against pipe 12 by spring 46 and serves to hold lower module 18 in place within the pipe. Tractor assembly 38 provides traction within pipe 12 but also preferably retracts to release tracks 44 from the pipe. Tracks 44 are preferably motorized so as to move lower module 18 up and down pipe 12, as desired.

Tractor assembly 38 provides sufficient force to hold lower module 18 in position when fluid is being circulated down through pipe 12 and to move the assembly upward through the pipe when fluid is being circulated downward. In certain embodiments tractor assembly 38 may include a safety braking system to prevent the descent of the assembly into pipe 12 should tracks 44 unexpectedly release from the wall of the pipe.

Surface module 14 connects to the upper end of pipe 12 through connection 22. Upper module 16 is supported by and electrically coupled to support frame 24 by electrical connectors 26 and 32. Cable 36 is connected to interface 40. Thus, communication between the data analysis system and accelerometer array 42 is along cable 28, through connectors 26 and 32, and through cable 36 to interface 40, which is coupled to accelerometer array 42. This communications link provides direct, two-way communication between accelerometer array 42 and the data analysis system.

Referring now to FIGS. 3a-3e, a sequence of events is shown illustrating the use of telemetry system 10 during drilling operations. A signal generating tool is disposed within the weilbore on drill string 50. This signal generating tool may transmit acoustic signals along drill string 50, within the drilling fluid (mud pulse telemetry), or any other downhole-to-surface communication method. In FIG. 3a, telemetry system 10 is shown disposed within drill string 50, when the upper end 52 of the drill string is above drill floor 54. Surface module 14 is connected to the upper end 52. Surface module 14 is connected to upper module 16, which is connected to lower module 18. From this initial configuration, a signal is given to the lower incdule 18 to disconnect from upper module 16 and move downward within drill string 50, as shown in FIG. 3b.

As lower module 18 moves away from upper module 16, cable 36 provides communication between the modules. Lower module 18 can move up or down within drill string 50 in order to optimize reception of telemetry signals traveling up the drill string or through the wellbore. In some embodiments, lower module 18 moves to a position below drill floor 54 in order to reduce the noise generated by the surface drilling equipment. In the preferred embodiments, a group of sensors is used to enhance signal reception and noise rejection in order to improve and optimize the signal to noise ratio.

For example, two or more of the accelerometers or transducers in the array can be operated so as to discriminate between upgoing and downgoing acoustic energy and utilized in accordance with U.S. Pat. No. 4,590,593, which is hereby incorporated by reference herein. In addition, the lower module 18 can be located such that the array is located at an antinode of acoustic radiation coming from downhole. Further, the moveable lower module 18 allows for the location to be adjusted to a position where the telemetry signal will be the strongest and noise from the drilling rig can be minimized.

As drilling progresses and upper end 52 approaches drill floor 54, lower module 18 is moved back up drill string 50 to engage upper module 16, as shown in FIG. 3*c*. A command is given to disengage upper module 16 from surface module 14. This command, and other communication once upper module 16 is separated from surface module 14, may be transmitted acoustically, and received by array 42, or via an electrical or electromechanical signal. FIG. 3*d* illustrates that once upper module 16 has been engaged by lower module 18 and disengaged from surface module 14, it is lowered down drill string 50 by lower module 18. Surface module 14 is then disconnected from drill string 50. As shown in FIG. 3*e*, additional drill pipe 56 is then connected to drill string 50 and surface module is reconnected to the new upper end 52 of the drill string. Lower module 18 then moves upper module 16 back to upper end 52 so that the upper module can reconnect to surface module 14 and reestablish the initial position as shown in FIG. 3*a*.

While preferred embodiments of this invention have been shown and described, modifications thereof can be made by one skilled in the art without departing from the scope or teaching of this invention. The embodiments described herein are exemplary only and are not limiting. For example, the relative dimensions of various parts, the materials from which the various parts are made, and other parameters can be varied, so long as the hydraulic retention system and apparatus retain the advantages discussed herein. Accordingly, the scope of protection is not limited to the embodiments described herein, but is only limited by the claims that follow, the scope of which shall include all equivalents of the subject matter of the claims.

What is claimed is:

1. A wellbore telemetry system comprising:
   a surface receiver system proximate a drill floor including:
      a surface module coupled to the upper end of a drillstring;
      an upper module detachably connected to said surface module and disposed within the drillstring;
      a lower module moveably disposed within the drillstring and coupled to said upper module;
      a wireless telemetry signal receiver disposed on said lower module, said lower module moveable in the drillstring between positions proximate the drill floor; and
   a downhole signal generating tool to communicate wireless telemetry signals to said moveable wireless telemetry signal receiver.

2. The wellbore telemetry system of claim 1 wherein said lower module further comprises a tractor assembly adapted to move said lower module through the drillstring.

3. The wellbore telemetry system of claim 1 further comprising a detachable electrical connector coupling said surface module to said upper module.

4. The wellbore telemetry system of claim 1 wherein said upper module further comprises a cable reel.

5. The wellbore telemetry system of claim 4 further comprising a cable spooled onto the cable reel and coupled to said lower module and said upper module.

6. A method for receiving telemetry signals comprising:
   disposing a surface receiver array within a drillstring;
   transmitting wireless telemetry signals from a signal generating tool disposed on said drillstring downhole of said surface receiver array;
   moving said surface receiver array within said drillstring and proximate a drill floor, to improve reception of said wireless telemetry signals; and
   relaying the received signal to a data analysis system.

7. The method of claim 6 wherein the receiver array is disposed on a tractor assembly adapted to move the array within the drillstring.

8. The method of claim 6 further comprising:
   disposing an upper assembly in the drillstring, wherein the acoustic receiver array is coupled to the upper assembly by a cable;
   connecting a surface module to the upper end of the drillstring; and
   detachably connecting the upper assembly to the surface module.

9. The method of claim 8 wherein the received acoustic signals are relayed from the acoustic receiver array through the cable to the upper assembly, from the upper assembly to the surface module, and from the surface module to the data analysis system.

10. A method for using a telemetry receiver system comprising:
    installing the telemetry receiver system on a drillstring proximate a drill floor, wherein the telemetry receiver system comprises:
       a surface module coupled to the upper end of the drillstring;
       an upper module detachably connected to the surface module and disposed within the drillstring; and
       a lower module moveably disposed within the drillstring and coupled to the upper module, wherein the lower module comprises a wireless telemetry signal receiver;
    moving the lower module within the drillstring and proximate the drill floor, to location optimizing the reception of wireless telemetry signals from a downhole signal generating tool; and
    relaying telemetry signals from the receiver to a data analysis system through the upper module and the surface module.

11. The method of claim 10 further comprising:
    moving the lower module into engagement with the upper module;
    detaching the upper module from the surface module;
    moving the lower module and upper module downward within the drillstring;
    removing the surface module from the drillstring;
    adding an additional length of drill pipe to the drillstring;
    connecting the surface module to the top of the drillstring;
    moving the lower module and the upper module upward through the drillstring;
    attaching the upper module to the surface module;

moving the lower module within the drillstring to a location optimizing the reception of wireless acoustic telemetry signals; and relaying telemetry signals from the receiver to a data analysis system through the upper module and the surface module.

12. The method of claim 10 wherein said lower module further comprises a tractor assembly adapted to move the lower module through the drillstring.

13. The method of claim 10 further comprising a detachable electrical connector coupling the surface module to the upper module.

14. The method of claim 10 wherein the upper module further comprises a cable reel.

15. The method of claim 14 further comprising a cable spooled onto the cable reel and coupled to the lower module and the upper module.

16. The wellbore telemetry system of claim 1 wherein at least one of said surface module, said upper module, and said lower module include a fluid path therethrough to allow fluid to be circulated through said drillstring.

17. The welibore telemetry system of claim 1 wherein said upper module includes a base directly and detachably connected to a support frame of said surface module.

18. The method of claim 10 wherein at least one of said surface module, said upper module, and said lower module include a fluid path therethrough to allow fluid to be circulated through said drillstring.

19. The method of claim 10 wherein said upper module includes a base directly and detachably connected to a support frame of said surface module.

20. The wellbore telemetry system of claim 1 wherein said wireless telemetry signals comprise at least one of a drilling parameter and a wellbore condition.

* * * * *